Dec. 22, 1953    B. G. COPPING    2,663,498
TEMPERATURE REGULATING SYSTEM
Original Filed May 12, 1947    3 Sheets-Sheet 1
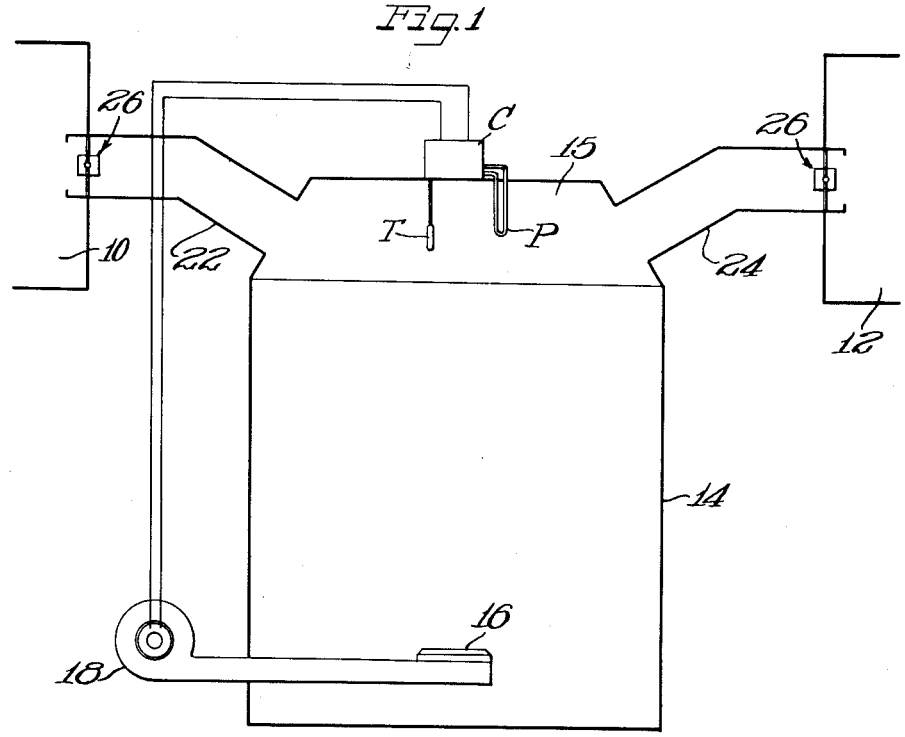
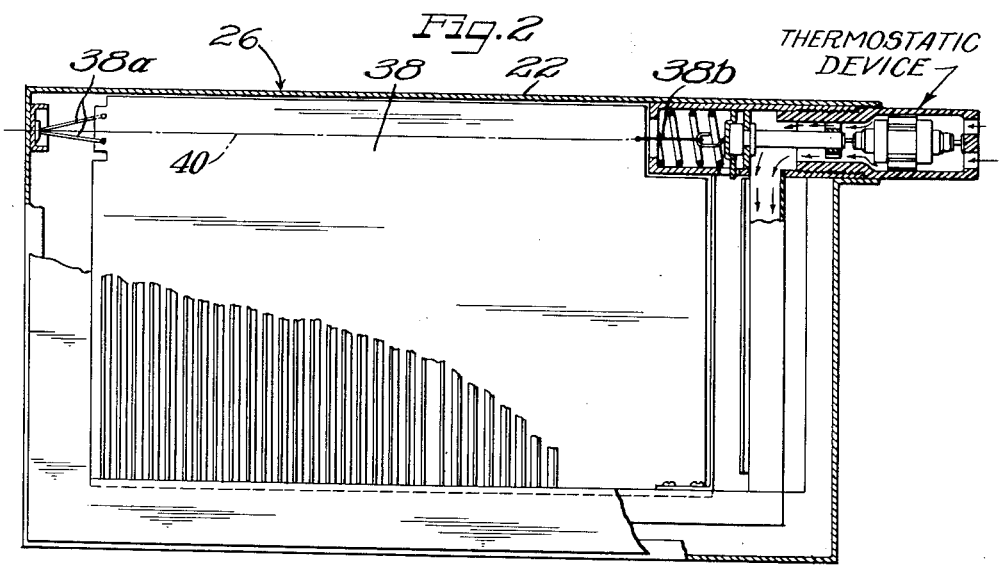
Inventor:
Bruce G. Copping
by Hill, Sherman, Meroni, Gross & Simpson Attys

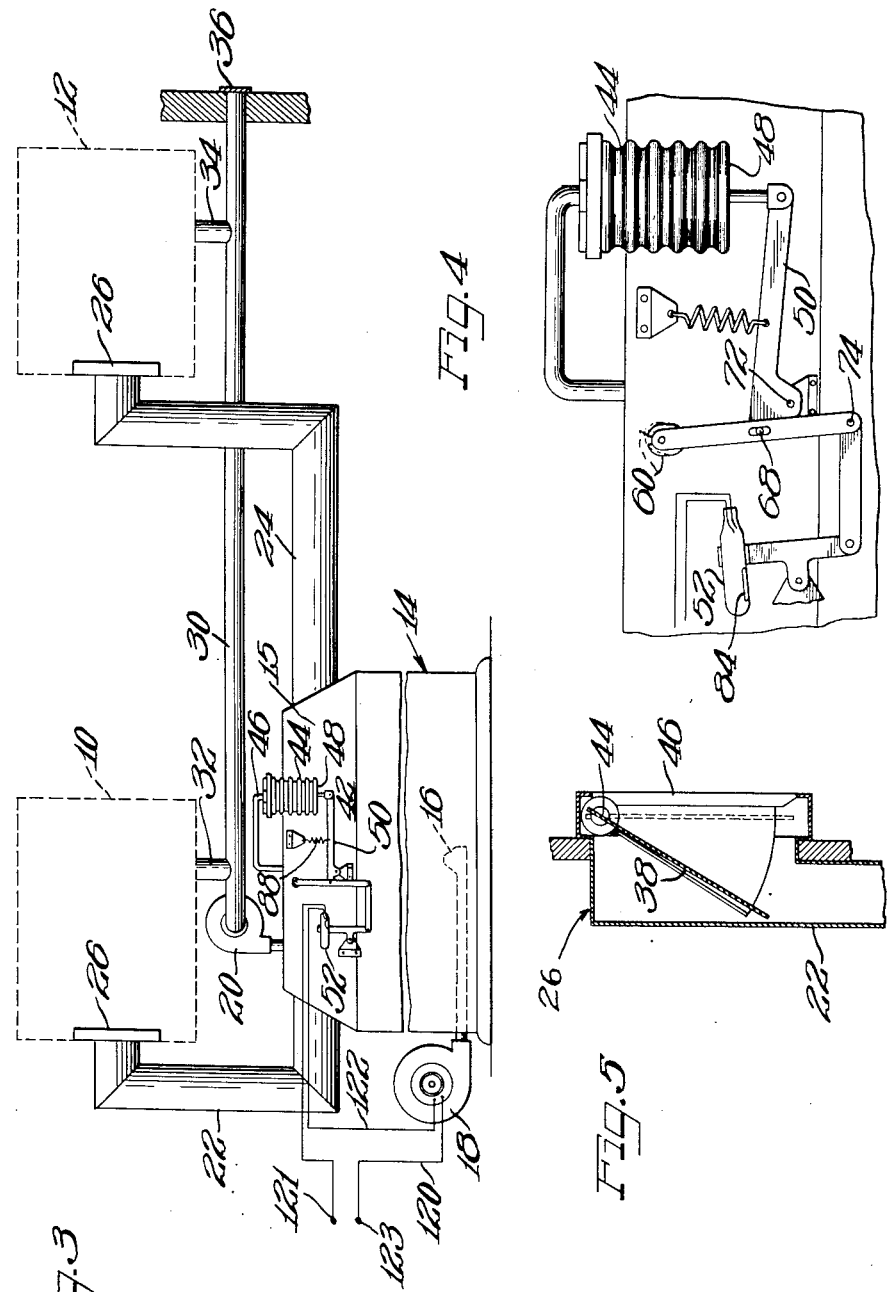

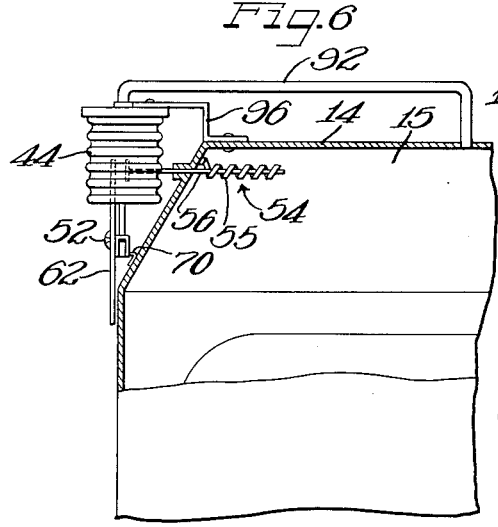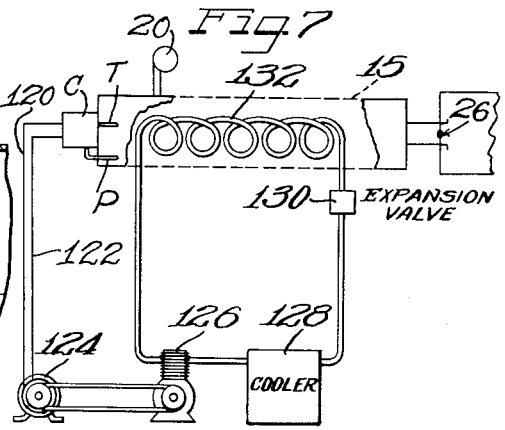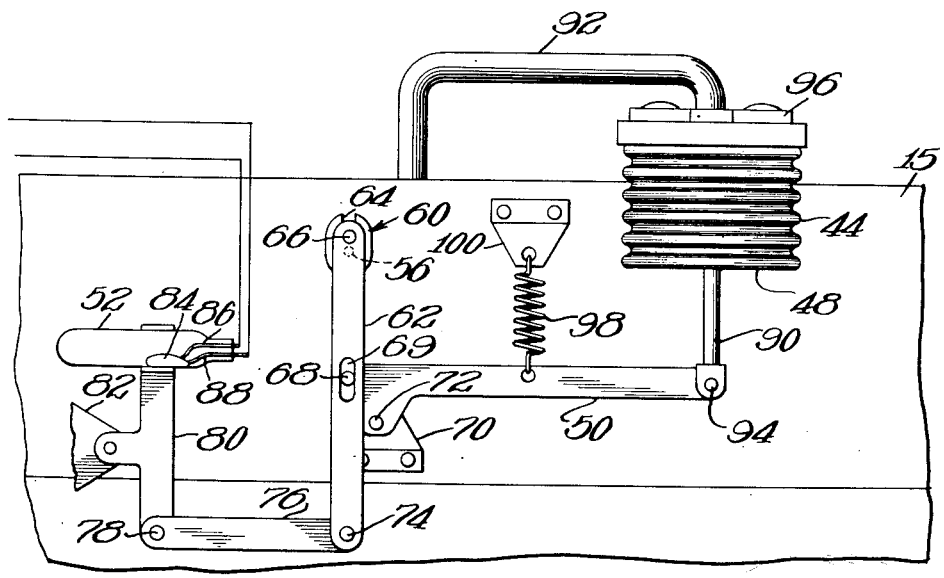

Patented Dec. 22, 1953

2,663,498

UNITED STATES PATENT OFFICE 2,663,498

TEMPERATURE REGULATING SYSTEM

Bruce G. Copping, Cuyahoga Falls, Ohio, assignor to Don Manufacturing Company, Chicago, Ill., a corporation of Illinois Continuation of application Serial No. 747,470, May 12, 1947. This application August 17, 1951, Serial No. 242,245

2 Claims. (Cl. 236—1)

This application constitutes a continuation of my copending abandoned application U. S. Serial No. 747,470, filed May 12, 1947.

This invention relates generally to ventilating apparatus and more particularly to a forced air ventilating system including a temperature conditioner having a plenum chamber receiving pressurized temperature conditioned air for selective delivery to a plurality of spaces, the flow of air to each space being regulated by an individual thermostatically controlled damper, and a control device to regulate the temperature conditioner including a static pressure element responsive to variations in static pressure within the plenum chamber, whereby the advantages of an averaging out control system are obtained.

Heretofore, the only ventilating systems which have afforded the advantages of an averaging out arrangement have required the provision of complex control systems suitable for large installations such as are found in hospitals, schools and other large public buildings.

According to the general principles of the present invention, a temperature conditioning unit such as a furnace is provided with a plenum chamber receiving pressurized temperature conditioned air. A duct carries the air from the plenum chamber to each space to be ventilated and a thermostatically controlled register or shutter in the duct controls the quantity of temperature conditioned air delivered to the space in response to temperature variations in the space. The temperature conditioning unit is regulated by a control mechanism operable within a predetermined adjusted temperature range and having a static pressure device sensitive to variations in static pressure within the plenum chamber to change the temperature of the air in the plenum chamber in response to the static pressure variations in the plenum chamber.

Since the individual registers respond to temperature variations within the particular space with which each register is associated, the variation in static pressure within the plenum chamber of the temperature conditioning unit will adequately reflect an averaged out total requirement in the ventilating system, which total requirement is necessarily dependent on many variables including atmospheric temperature, wind losses, and other heat transfer factors.

The arrangement thus provided affords an optimum operating condition for a small forced air temperature conditioning system such as is frequently used in small residential type ventilating systems. The automatic modulation of the temperature conditioned air will permit the individual shutters to operate at or near the most satisfactory degree of opening, thereby eliminating whistling and air surges and will also afford a substantially continuous flow of properly conditioned air which reduces stratification, air blast and uncomfortable temperature differentials in the spaces being ventilated.

It is an object of the present invention, therefore, to provide a simplified ventilating system having the advantages of an averaging out control system and particularly suited for installation in ventilating systems of small capacity.

Another object of the present invention is to provide a control apparatus for a ventilating system which controls the temperature conditioning unit in response to variations from a predetermined static pressure reference level.

A further object of the present invention is to provide a highly simplified and economical averaging out control system for a forced air ventilating system.

Many other advantages, features and additional objects of the present invention will become manifest to those versed in the art upon making reference to the detailed description which follows and the accompanying sheets of drawings in which a preferred structural embodiment incorporating the principles of the present invention is shown by way of illustrative example.

On the drawings:

Figure 1 is a diagrammatic view of a temperature conditioning system incorporating the principles of the present invention;

Figure 2 is an elevational view of a shutter unit or register which may be employed in accordance with the principles of the present invention and is shown with parts in cross section to demonstrate how the shutter is thermostatically controlled;

Figure 3 is a somewhat diagrammatic view showing a warm air heating furnace of the forced air type with piping connections to the spaces to be heated, together with a pressure regulating system of one type contemplated by the present invention;

Figure 4 is an enlarged side elevational view of one preferred structural embodiment of a regulating mechanism provided in accordance with the principles of the present invention;

Figure 5 is a transverse sectional view of the control shutter as shown in Figure 2;

Figure 6 is an enlarged fragmentary cut away elevational view of the furnace shown in Figure 3 and the temperature regulating mechanism;

Figure 7 is a somewhat schematic diagram of an air cooling system constructed in accordance with the principles of the present invention; and Figure 8 is an enlarged side elevational view of the regulating mechanism provided as one preferred embodiment in accordance with the principles of the present invention.

As shown on the drawings:

In Figure 1 is shown a ventilating system in which the spaces to be ventilated are indicated at 10 and 12, respectively, these constituting, for example, the separate rooms of a home. The temperature conditioning unit of the ventilating system is indicated as comprising a furnace 14 system for supplying temperature conditioned air to the rooms 10 and 12 and may include, for example, an oil burner 16 to which fuel and air are supplied by a unit 18 conventionally including an oil pump, an air blower and a driving motor.

The furnace 14 is provided with a plenum chamber 15 which receives the pressurized temperature conditioned air.

A duct 22 carries the temperature conditioned air from the plenum chamber 15 to the space 10 and a duct 24 carries the temperature conditioned air from the plenum chamber 15 to the space 12, each of the ducts 22 and 24 being controlled by a thermostatically operated shutter unit indicated generally at 26.

Figures 2 and 5 show one type of shutter unit suitable for thermostatic operation, whereby flow of heated air may be admitted to spaces 10 and 12 in response to temperature variations therein.

A shutter 38 suspended under tension and torsionally loaded by support members including twisted elements 38a and tension chord 38b is rotated on an axis 40 whenever a thermostatic device of the type having elements displaceable in response to temperature variations and indicated by legend, changes the tension on the shutter and causes the shutter to seek a new position of equilibrium.

Air from the space associated with the shutter unit is aspirated past the thermostatic elements in the direction shown by the arrows (Figure 2) by an aspirator structure surrounding the thermostat and communicating with the duct.

For additional details of construction of such a shutter arrangement, reference may be had to my copending application U. S. Serial No. 708,224, filed November 7, 1946, now Patent No. 2,523,497 and U. S. Serial Nos. 25,837 and 25,838, both filed on May 8, 1948, now issued as Patent Nos. 2,423,498 and 2,423,499.

It will be apparent upon referring to Figure 1 that each of the thermostatically controlled shutter units 26 will respond to the temperature variations in the individual spaces 10 and 12 according to the variable heat transfer factors which affect the heat losses experienced by the ventilating system. Thus, as the shutters are respectively opened and closed, the movement of air from the plenum chamber 15 into each of the spaces 10 and 12 will be automatically varied so as to change the static pressure within the plenum chamber 15. It may be noted, therefore, that the quantitative value of the static pressure in the plenum chamber 15 is a function of the total averaged shutter position and is representative of the total averaged system temperature conditioning requirement.

In accordance with the principles of the present invention, this phenomenon is advantageously exploited to control the temperature of the temperature conditioned air flowing from the plenum chamber 15 into each of the spaces 10 and 12 as a function of the changes of static pressure within the plenum chamber 15. To effect this end, a control device is indicated in Figure 1 by the reference character C which is provided a thermally sensitive element T to maintain the air in the bonnet 15 within a predetermined temperature range. The control device C is further provided with a static pressure element P in the bonnet 15 responsive to variations in static air pressure in the bonnet 15 to control automatically the temperature gradient between the bonnet 15 and the spaces 10 and 12 in response to the static air pressure variations. The control device C, of course, is placed in control of the unit 18.

In order that the principles of the present invention may be more clearly understood, a specific structural embodiment of the principles of the present invention will be described. Figure 3 shows a warm air heating system in which the spaces to be heated are indicated at 10 and 12 by a furnace 14 having an oil burner 16 supplied by a unit 18. A fan 20 is provided to force pressurized air into the bonnet. Air flow from duct 22 into the space 10 is controlled by a thermostatically operated shutter unit 26. Similarly, air from duct 24 passes through a thermostatically controlled shutter unit 26 to space 12. Exhaust air from spaces 10 and 12 passes to inlet duct 30 from pipes 32 and 34 respectively and thus travels to fan 20 to be recirculated through the system. Inlet duct 30 may be in communication with outside air vent 36 which provides fresh air for the system to supplement the air circulated therein.

As the outside air temperature, occupancy of the building, outside wind velocity, or other factors alter the heat requirements of the spaces 10 and 12, the shutter units 26 open and close in an effort to maintain constant air temperatures in the spaces. As a consequence of this fact, the air pressure in the bonnet 15 of furnace 14 rises or falls due to the variations in the resistance of the shutters and shutter units 26 to the escaping air. Thus, for example, if the outside air temperature rises so as to decrease the heat requirements of spaces 10 and 12, the shutters and shutter units 26 close to reduce the hot air flow thereto and cause correspondingly increased resistance to the escaping air and an increased air pressure within the bonnet 15 of furnace 14. Conversely, if the outside wind velocity, for example, should increase so as to cause increased leakage of cool air into spaces 10 and 12 and greater heat losses through the walls of the building, the shutters and shutter units 26 open to increase the hot air flow thereto and cause correspondingly less resistance to the escaping air and reduced air pressure within the bonnet 15 of furnace 14.

In the embodiment of Figure 3, the control mechanism is indicated generally at 42 and comprises a bellows 44 connected on its inside for communication with the bonnet 15 of furnace 14 by pipe 92. The bottom plate 48 of bellows 44 is connected to arm 50 which rotates mercury switch 52 to control the application of power to the motor of pump 18 and thereby to control the pressure within the bonnet of furnace 14. This control is achieved by interrupting the application of electric power from leads 120 and 122 to unit 18, this power being derived from a suitable source of electromotive force connected to terminals 121 and 123.

In Figure 6, the numeral 54 represents a bimetallic thermostat control element comprising a coil 55 attached at one end to the housing of furnace 14 and at the other end to rod 56 so as to rotate that rod in accordance with the temperature of the air in the furnace bonnet region 15. The rod 56 extends through the furnace 14 and terminates in fork 60, which is best seen in the enlarged elevational view of Figure 8. Lever arm 62 is connected to the slot 64 and fork 60 by pin 66. This lever arm is further supported from the housing of furnace 14 by pin 68 which rides in slot 69 of arm 62 and is supported on lever arm 50. The latter arm is rotatably supported on bracket 70 by pin 72. At the opposite end of arm 62, pin 74 is provided to secure a rotatable attachment thereof with lever arm 76. Lever arm 76 is connected through pin 78 to arm 80 which rotatably supports mercury switch 52 from bracket 82.

The above described elements operate to control the temperature conditioning unit or furnace 14 in accord with the air temperature of the bonnet 15 to maintain the temperature within a predetermined range of temperature values. Thus, for example, if the air temperature in bonnet 15 rises above the upper limit of this range, fork 60 is rotated by shaft 56 in a counter-clockwise direction as seen in Figure 8, thereby tending to rotate lever arm 62 in the counter-clockwise direction about pin 68 and causing similar counter-clockwise motion of lever arm 80. This causes the mercury drop 84 within switch 52 to roll away from electrodes 86 and 88 to interrupt the electrical connection therebetween and deenergize the temperature conditioning 18. On the other hand, if the air temperature in bonnet 15 decreases below the lower limit of this range, the reverse action takes place. In this case, the arm 80 is rotated in the clockwise direction to cause mercury drop 84 to roll in the direction of electrodes 86 and 88 to establish an electrical connection therebetween. Thus, the mechanism operates to open and close the switch 52 in accord with the temperature in bonnet 58 and maintains the temperature therein within a predetermined range of values.

The temperature at which the bimetal element 54 closes the circuit between electrodes 86 and 88 and a temperature at which it opens this circuit are not to be seen for the reason that frictional opposition to motion of the mercury ball 84 and movement of the linkages, together with lost motion in the mechanical system, requires that bimetal element 54 execute a certain amount of motion before that motion is reflected in corresponding opening or closing of the electrical circuit between electrodes 86 and 88.

In Figure 4, the bellows 44 are shown in the position corresponding to increased air pressure within bonnet 15 over the value corresponding to the view of Figure 8. This increased pressure extends bellows 44 to depress plate 48 and rotate on 50 in the clockwise direction about pin 72, thereby swinging pivots 68 and 74 in the right hand direction, as shown in Figure 4, and tilting switch 52 in the clockwise direction. This causes mercury drop 84 to travel toward the end of switch 54 opposite electrodes 86 and 88, thereby disconnecting these electrodes and deenergizing the unit 18 when the fork 60 remains in the position shown in the dotted lines of Figures 4 and 8. It is thus evident, that increased air pressure within the bonnet 15 causes the motor of the unit 18 to be deenergized even though the temperature within the bonnet 15 remains the same.

It will be evident that the fork 60 must rotate to a new position, such as that shown by the dotted lines, to cause mercury drop 84 to roll to the end of switch 52 to cause contact between electrodes 86 and 88. Conversely, the fork 60 must assume still another position to cause the mercury drop 84 to disconnect contacts 86 and 88. Thus, the effect of bellows 44 is to alter the positions of fork 60 corresponding to energizing and deenergizing of the unit 18. As these positions are determined solely by the temperature within the furnace bonnet, the range in temperature automatically maintained by operation of the control system is altered in accordance with the pressure within the furnace bonnet 15, therefore, the air temperature in the bonnet 15 will be decreased as the air pressure in the bonnet 15 rises.

In Figure 7, the principles of the present invention are applied to an air cooling system. In this embodiment, leads 120 and 122 lead to motor 124 which is operatively connected to compressor 126 to compress a refrigerating fluid which is subsequently cooled in cooler 128. The fluid then flows to expansion valve 130, through cooling coil 132, and then returns to the compressor 126. It will be understood that the cooling coil 132 can be located in the bonnet 15 of a temperature conditioning unit so that air passing therethrough is cooled. The other portions of the temperature conditioning system are similar to those previously described except that the individual shutters controlling the supply of conditioned air to each of the spaces 10 and 12 would be arranged to open upon increased temperatures therein and close upon decreased temperature and the switch 52 would be arranged to open and close in response to pressure variations in the bonnet for cooling operation.

It will be observed that the mechanism of the present invention acts to supply air to the spaces heated or cooled, the temperature of the supply air differing from the temperatures in the spaces ventilated in direction to compensate for the heat transfer therefrom or thereto. Moreover, in each system, the difference between the temperature of the supply air and the temperature in the spaces is increased as the amount of air called for by the automatic control shutters rises. Thus, the system acts to increase the heating or cooling value of the supply air in accord with the pressure variations occurring in the plenum chamber of a temperature conditioning unit, or in other words, in accordance with the quantity of air demanded by the shutters controlling the air supply to the separate spaces.

Although it is contemplated that various structural modifications might be suggested by those versed in the art, it should be clearly understood that I do not wish to be limited to the illustrative details which have been necessarily described herein for the sake of clarity but wish to embody within the scope of this invention all such modifications as reasonably and properly come within the scope of my contribution to the art.

I claim as my invention:

1. A regulator for use in an air temperature conditioning system of the type wherein a plurality of shutters control air flow from a source of temperature conditioned air to spaces to be temperature conditioned, said regulator including a switch in control of said source shiftable to a first position whereby said source is operative and a second position whereby said source is inactivated, a lever arm pivotally supported at a fulcrum and operatively connected to said switch to shift said switch between said first position and said second position, a temperature sensitive element disposed partially within said source and pivotally connected to said arm to control the position thereof in direction to maintain the temperature of said conditioned air within predetermined limits, and bellows in communication with said source to control the position of said fulcrum to shift said arm to alter the temperature of said source in direction to increase the temperature differential between said source and said spaces as said bellows collapse.

2. A system to supply conditioned air to a plurality of spaces including a source of temperature conditioned air, said source having an electrical mechanism to condition said air, ducts in communication with said source and said spaces, shutters automatically to control the air flow through said ducts to maintain the air temperature in said spaces at predetermined values, a switch in control of said electrical mechanism shiftable to a first position whereby said mechanism is energized and a second position whereby said mechanism is inactivated, a lever arm pivotally supported at a fulcrum and operatively connected to said switch to shift said switch between said first position and said second position, a temperature sensitive element disposed partially within said source and pivotally connected to said arm to control the position thereof in direction to maintain constant the temperature of said conditioned air, and bellows in communication with said source to control the position of said fulcrum in direction, said bellows being disposed to increase the temperature differential between said source and said spaces as said bellows collapse.

BRUCE G. COPPING.

References Cited in the file of this patent

UNITED STATES PATENTS

| Number | Name | Date |
|---|---|---|
| 2,440,052 | Lingen | Apr. 20, 1948 |
| 2,454,511 | Heymann | Nov. 23, 1948 |
| 2,495,861 | Newton | Jan. 31, 1950 |
| 2,537,315 | Newton | Jan. 9, 1951 |